United States Patent
Franzke et al.

(10) Patent No.: US 7,992,946 B2
(45) Date of Patent: Aug. 9, 2011

(54) METHOD FOR OPERATING A BRAKE SYSTEM OF A MOTOR VEHICLE

(75) Inventors: Knut Franzke, Oberriexingen (DE); Mario Schmidt, Ilsfeld-Auenstein (DE)

(73) Assignee: Robert Bosch GmbH, Stuttgart (DE)

( * ) Notice: Subject to any disclaimer, the term of this patent is extended or adjusted under 35 U.S.C. 154(b) by 4 days.

(21) Appl. No.: 11/824,097

(22) Filed: Jun. 28, 2007

(65) Prior Publication Data

US 2008/0001476 A1 Jan. 3, 2008

(30) Foreign Application Priority Data

Jun. 29, 2006 (DE) .................. 10 2006 029 979

(51) Int. Cl.
*B60T 13/18* (2006.01)
(52) U.S. Cl. .......................... 303/11; 303/191
(58) Field of Classification Search ............. 303/3, 11, 303/20, 191, 114.1; 188/1.11 E, 1.11 L, 188/158, 162
See application file for complete search history.

(56) References Cited

U.S. PATENT DOCUMENTS

| | | | |
|---|---|---|---|
| 5,988,768 A | | 11/1999 | Schaefer et al. |
| 6,193,021 B1 * | | 2/2001 | Dieckmann et al. ..... 188/1.11 E |
| 6,250,436 B1 * | | 6/2001 | Oikawa et al. ............. 188/72.1 |
| 6,748,310 B2 * | | 6/2004 | Tamasho et al. ............... 701/70 |
| 6,816,768 B2 * | | 11/2004 | Tamura et al. .................. 701/70 |
| 7,234,786 B2 * | | 6/2007 | Mori et al. ..................... 303/191 |
| 2007/0114838 A1 * | | 5/2007 | Bitz ................................. 303/11 |

FOREIGN PATENT DOCUMENTS

| | | |
|---|---|---|
| DE | 195 46 647 | 6/1997 |
| DE | 198 18 156 | 10/1999 |
| DE | 199 43 601 | 3/2001 |
| DE | 103 21 159 | 12/2004 |
| DE | 10 2004 030 464 | 1/2006 |

* cited by examiner

*Primary Examiner* — Christopher P Schwartz
(74) *Attorney, Agent, or Firm* — Kenyon & Kenyon LLP

(57) ABSTRACT

A method for operating a brake system of a motor vehicle, which has at least one operating mode (normal, sporty, etc.), includes prefilling, to at least partially overcome a clearance of one or a plurality of wheel brake(s) prior to an expected actuation of a brake pedal, an actuation of the brake pedal being expected at specific positions and/or gradients of the actuation of operating devices of the motor vehicle, in particular an accelerator pedal. The method includes an operating mode in which the gradient is specified as a function of the dynamics and/or limit values of the actuation of the operating devices.

16 Claims, 2 Drawing Sheets

METHOD FOR OPERATING A BRAKE SYSTEM OF A MOTOR VEHICLE

CROSS-REFERENCE TO RELATED APPLICATIONS

The present application claims priority to Application No. 10 2006 029 979.5, filed in the Federal Republic of Germany on Jun. 29, 2006, which is expressly incorporated herein in its entirety by reference thereto.

FIELD OF THE INVENTION

The present invention relates to a method for operating a brake system of a motor vehicle, e.g., which has at least one operating mode including prefilling, to at least partially overcome a clearance of one or a plurality of wheel brake(s) prior to an expected actuation of a brake pedal, an actuation of the brake pedal being expected at specific positions and/or gradients of the actuation of operating devices of the motor vehicle, e.g., an accelerator pedal. Furthermore, the present invention relates to a device, e.g., a control device, as well as a computer program for implementing the program.

BACKGROUND INFORMATION

German Published Patent Application No. 10 2004 030 464 describes a method for electronic brake control, in which the clearance is overcome by prefilling the servo-hydraulic brake systems if the accelerator is released at a gradient that exceeds a minimum gradient. In this context it is assumed that, in an emergency situation, for example, the driver will release the accelerator pedal abruptly, and the prefilling will be activated in such a situation.

The method allows the clearance to be overcome by prefilling the brake system only in those instances where the driver releases the accelerator abruptly. This is typically provided only in an emergency situation. With a so-called sporty or dynamic driving style, in which there is a frequent change between acceleration by operating the accelerator pedal, and deceleration by operating the brake pedal, and in which the accelerator pedal is normally not released abruptly, the clearance of the service brake is therefore not overcome. The driver of the motor vehicle perceives this as a delayed response of the service brake.

SUMMARY

Example embodiments of the present invention provide a method, a device, as well as a computer program that allow the clearance of the wheel brake to be overcome even outside of danger situations.

According to an example embodiment of the present invention, a method is for operating a brake system of a motor vehicle, which has at least one operating mode including prefilling, to at least partially overcome a clearance of one or a plurality of wheel brake(s) prior to an expected actuation of the brake pedal, an actuation of the brake pedal being expected at specific positions and/or gradients of the actuation of operating devices of the motor vehicle, e.g., an accelerator pedal, the method including an operating mode in which the gradient is specified as a function of the dynamics and/or limit values of the actuation of the operating devices. The gradient of the actuation of the operating device, e.g., the accelerator pedal, may become randomly low, that is to say, it may basically even become zero. This has the result that the prefilling of the brake, and therefore the overcoming of the clearance of the wheel brake, i.e., the application of the brake linings, is already activated upon any randomly slow release of the accelerator pedal. To this end, an operating state in which the randomly slow release of the accelerator pedal already causes prefilling of the brake is defined and detected during operation and possibly activated, if appropriate. Here, this operating state is referred to as "sporty driving style" or "dynamic driving style." In addition, any number of other operating states may exist, e.g., a "normal driving style" operating state, in which a minimum gradient of the release of the accelerator thus is required to overcome the clearance of the wheel brake, i.e., prefilling of the brake takes place only in an emergency situation, as in certain conventional systems. The dependence of the gradient on the dynamics and/or limit values of the actuation of the operating devices means that the type of actuation, in the form of actuation speed, maximum displacements or maximum pressures, is monitored over a specific period of time and analyzed. Unlike in certain conventional systems, the prefilling of the brake is thus no longer solely a function of the one-time release of the accelerator at a minimum gradient, but of the actuations of a plurality of operating devices monitored over a specified time interval, e.g., the actuation of the accelerator and the brake pedal. However, additional operating parameters of the motor vehicle, such as speed, dynamic response of the requested torque (both brake and engine torque), maximum accelerations both in the longitudinal vehicle direction and in the transverse vehicle direction, etc., may be taken into account in this context.

It may be provided to activate the prefilling in the operating mode as soon as the position of the accelerator pedal is modified to a lower torque request, i.e., as soon as the accelerator pedal is released. In addition, the operating mode is determined as a function of the dynamics and/or limit values of a driver-side torque request, e.g., the position of the accelerator pedal, and/or a requested deceleration, i.e., the position of the brake pedal. Both the maximum value of the driver-side torque request and the gradient of the modification of the driver-side torque request, e.g., the rate at which the accelerator-pedal position is modified, are able to be taken into account in the driver-side torque request. In the deceleration request, it is possible to consider the maximum actuation travel or the maximum actuation force, and also the gradient of the brake pedal actuation.

The operating mode may be activated when an index, which is formed from the dynamics and/or limit values of the actuation of the operating device, exceeds a specified value. The index may be evaluated in the form of a loop, i.e., it is permanently evaluated at specific time intervals or in the presence of specific other triggering events, such as after traveling a specific distance, etc. In this context, it may be provided that, if the maximum braking wish is above an upper threshold, the index is increased by a specific value in the loop-type evaluation of the operating parameters of the motor vehicle. It may be provided that, if the maximum braking wish is below the upper threshold and above a lower threshold, the index remains unchanged in the loop-type evaluation of the operating parameters of the motor vehicle. In addition, it may be provided that, if the maximum braking wish is below the lower threshold, the index is decreased by a specific value in the loop-type evaluation of the operating parameters of the motor vehicle.

A computer program includes program codes for implementing the steps of the method when the program is executed on a computer.

A device, e.g., a control device, includes a device for operating a brake system of a motor vehicle, e.g., a power-assisted or power-actuated brake system, having at least one operating mode which includes prefilling, to at least partially overcome a clearance of one or a plurality of wheel brake(s) prior to an expected operation of a brake pedal, an operation of the brake pedal being expected at specific positions and/or gradients of the actuation of operating devices of the motor vehicle, e.g., an accelerator pedal, the device including an operating mode in which the gradient is specified as a function of the dynamics and/or limit values of the actuation of the operating devices.

Exemplary embodiments of the present invention are described in greater detail below with reference to the appended Figures.

DETAILED DESCRIPTION

Figure 1:
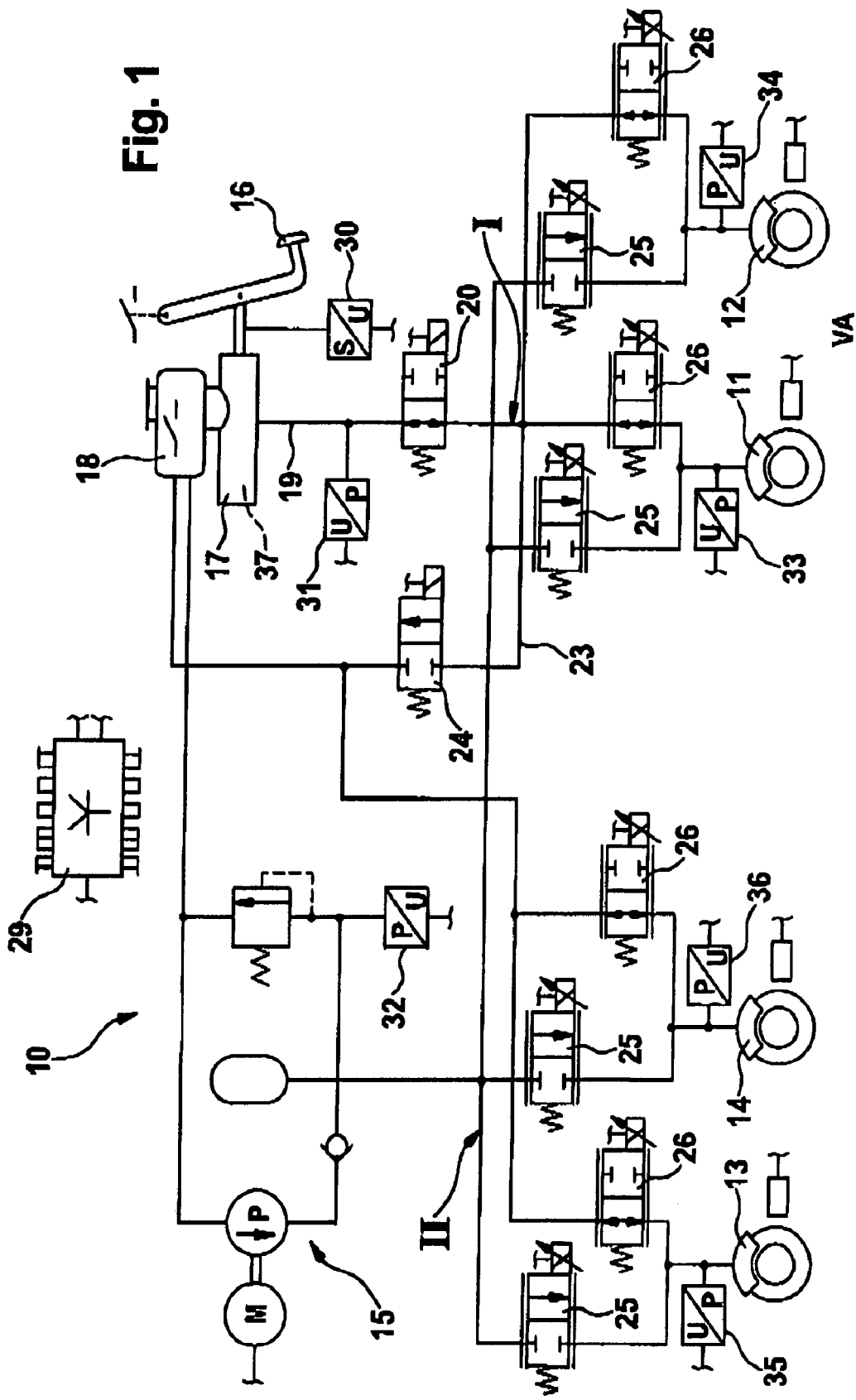
FIG. 1 is a schematic view of a power-assisted, hydraulic brake system.

A power-assisted, hydraulic brake system (wheel brake system) 10 for passenger cars illustrated in FIG. 1 has a brake circuit I assigned to wheel brakes 11, 12 of front axis VA of the vehicle, and a brake circuit II assigned to wheel brakes 13, 14 of rear axis HA. A servo-pressure source 15, which supplies the energy required to generate braking force, is connected to both brake circuits I and II. Brake system 10 also has a service brake, which is activated by external forces. Brake system 10 also includes a secondary brake, which is actuated by muscular energy. It has a main brake cylinder 17, which is actuable by a brake pedal 16 and includes a pressure-medium reservoir 18. Main brake cylinder 17 has a one-circuit design, i.e., it is connected to brake circuit I by a line 19 and a first valve 20 disposed therein. In the illustrated position of valve 20, the secondary brake thus acts only on wheel brakes 11 and 12 of front axis VA. With an active service brake, valve 20 blocks the connection between the main brake cylinder and wheel brakes 11 and 12. First valve 20 assigned to main brake cylinder 17 is therefore denoted as shutoff valve in the following text.

Servo-pressure source 15 aspirates pressure medium from reservoir 18 of main brake cylinder 17 and pressurizes it to high pressure for the functionality of the service brake. Pressure medium withdrawn from wheel brakes 11 to 14 while the service brake is in action is returned to reservoir 18. To block brake circuit I with respect to pressure medium reservoir 18 when the secondary brake is active, a shutoff valve 24 is disposed in a line 23 leading to the pressure medium reservoir. In addition, two valves 25 and 26 for the brake-pressure modulation in an active service brake are assigned to each wheel brake 11 to 14.

Brake system 10 is equipped with an electronic control device 29 to which a displacement sensor 30, which detects the displacement of brake pedal 16, is connected in addition to valves 20, 24, 25 and 26, as well as six pressure sensors 31 to 36 by which the pressure generated by main brake cylinder 17, the pressure supplied by servo-pressure source 15, and also the pressures applied into wheel brakes 11 to 14 are able to be detected. While the secondary brake operates hydraulically in a conventional manner, without involvement of control device 29, the service brake operates electro-hydraulically, i.e., when the driver of the passenger car actuates brake pedal 16, the electrical displacement signal detected by displacement sensor 30, and possibly additional electrical signals are analyzed by control device 29 for the control of valves 29, 24, 25 and 26 in order to generate brake pressure inside wheel brakes 11 to 14 according to the requested brake torque, the brake pressure being monitored by the control device with the aid of the electrical signals from pressure sensors 31, 33 to 36.

The following exemplary embodiment of the method assumes an electromechanical brake system as described, for instance, as piezo-hydraulic wheel brake device in German Published Patent Application No. 198 18 156, or as electrohydraulic brake system in German Published Patent Application No. 195 46 647, or as electromechanical brake in German Published Patent Application No. 103 21 159 and German Published Patent Application No. 199 43 601.

Figure 2:
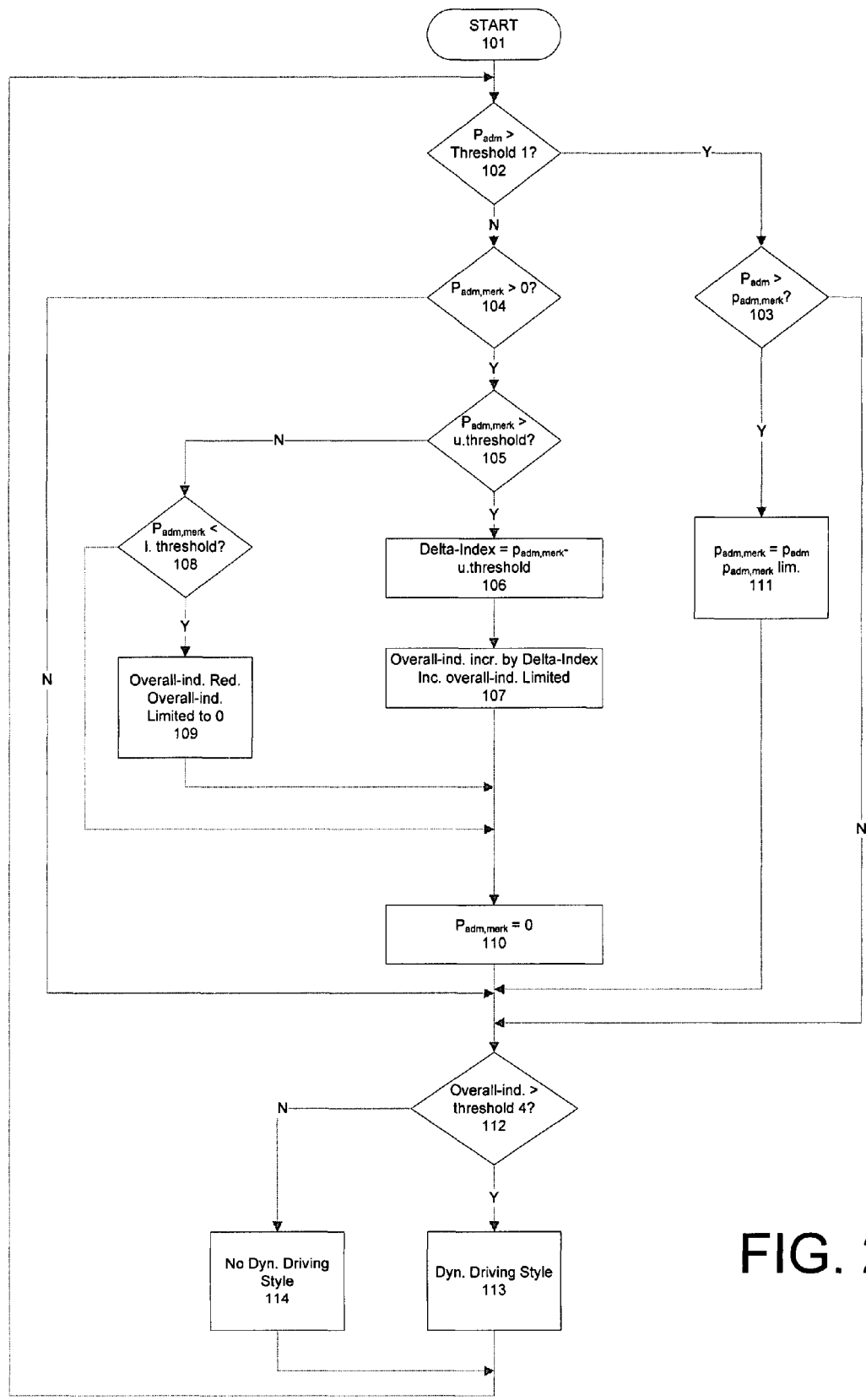
FIG. 2 is a flow chart illustrating a method according to an example embodiment of the present invention.

In the following text, an exemplary embodiment of the method is described with reference to FIG. 2. The function of the electronic prefilling of the service brake (electronic brake prefill, EBP) overcomes the clearance of the wheel brake by already applying the brake pads when releasing the accelerator pedal. By overcoming the clearance, the response time of the wheel-brake system (service brake) in a subsequent actuation of the brake pedal is shortened. This leads to a shorter pressure-generation time, which reduces the stopping distance. The clearance is overcome by the hydraulic control unit, a slight wheel pressure being set for applying the brake pads. According to example embodiments of the present invention, the prefilling activation takes place independently of the accelerator-pedal gradient, and thus independently of a potential emergency situation. To this end, a "sporty" operating mode is provided. In the sporty operating mode the prefilling is no longer activated as a function of the accelerator-pedal gradient, but already implemented when the torque request is reduced by the accelerator-pedal position, i.e., when the accelerator pedal is released by the driver, independently of the gradient at which the accelerator pedal is released. To this end, it is provided to detect the sporty operating mode on the basis of the driver's driving style. The driving style of the driver is detected via the dynamics of the actuation of the service brake as one of a plurality of operating devices of the driver, and/or on the basis of limit values of this actuation. That is to say, the brake-pedal actuations of the driver are recorded over a defined period of time and evaluated. To this end, the braking wish of the driver is detected, for instance, by detecting the brake pressure and/or brake force and/or pedal displacement. If the amount of the braking wish exceeds a threshold value, then the sporty driving style is detected, and a transition takes place into the sporty operating mode. This method is illustrated in the following text on the basis of the flow chart from FIG. 2. The method begins in step 101. In step 102, it is checked whether admission pressure $P_{adm}$ exceeds a first threshold Sw1, $P_{adm}$>threshold Sw1. If this is the case, marked by the Y branching, then branching to step 103 takes place; if this is not the case, marked by the N branching, then branching to step 104 occurs. In step 103, it is checked whether admission pressure $P_{adm}$ is greater than a stored admission pressure $P_{adm,merk}$. In step 104 it is checked whether stored admission pressure $P_{adm,merk}$ is greater than zero. If stored admission pressure $P_{adm,merk}$ is greater than zero in step 104, then branching to step 105 takes place, which is indicated by the Y branching. In step 105, it is checked whether stored admission pressure $P_{pre,merk}$ is greater than an upper threshold $Sw_u$. If this is the case, marked by the Y branching, then branching to step 106 takes place. In step 106, a value Delta-Index is formed from the difference of the stored admission pressure minus upper threshold value $Sw_u$, Delta-Index=$P_{adm,merk}$–$Sw_u$. In step 107, index I is then increased by the Delta-Index value. In doing so, index I is limited to a maximum value of index $I_{max}$. If the check in step 105 indicates that stored admission pressure $P_{adm,merk}$ is smaller than upper threshold $Sw_u$, indicated by the N branching, then branching to step 108 takes place. In step 108, it is checked whether stored admission pressure $P_{adm,merk}$ is smaller than a lower threshold $Sw_l$. If this is the case, marked by the Y branching, then it is branched to step 109. In step 109, the overall index is reduced by a constant value, the overall index being limited to the value of zero in the downward direction. If stored admission pressure $P_{adm,merk}$ is greater than lower threshold $Sw_l$, indicated by the N branching, in the check in step 108, then branching to step 110 takes place. In step 110 stored admission pressure $P_{pre,merk}$ is set back to zero.

If it is determined in step 103 that admission pressure $P_{adm}$ is greater than stored admission pressure $P_{adm,merk}$, indicated by the Y branching, then branching to step 111 takes place. In step 111, stored admission pressure $P_{adm,merk}$ is assigned the value of admission pressure $P_{adm}$, the value of stored admission pressure $P_{adm,merk}$ being limited to an upper limit $P_{adm,merk,max}$. Branching to step 112 takes place next. Branching to step 112 also takes place from step 110, and from step 103 and 104, if the checks here branch to the N option, in which case it is then branched to step 112. In step 112, it is checked whether overall index $I_n$ is greater than a threshold $Sw_n$ for the overall index. If this is the case, marked by the Y branching, then the sporty operating mode will be activated in step 113. If the check in step 112 indicates that the overall index is not greater than the threshold for overall index $Sw_n$, marked by the N option, then the sporty operating mode will be deactivated in step 114. The method ends in step 115. From step 115 it is branched back again to step 101, in a loop, possibly with a time delay.

What is claimed is:

1. A method for operating a brake system of a motor vehicle, which has at least one operating mode, the method comprising:
   prefilling the brake system, so as to at least partially overcome a clearance of at least one wheel brake prior to an expected actuation of a brake pedal, an actuation of the brake pedal being expected at least one of (a) specific positions and (b) gradients of de-actuation of an accelerator pedal of the motor vehicle; and
   specifying, in an operating mode, a gradient of de-actuation of the accelerator pedal as a function of at least one of (a) dynamics and (b) limit values of the actuation of operating devices of the motor vehicle;
   wherein the operating mode is activated when an index, which is formed from at least one of (a) the dynamics and (b) the limit values of the actuation of the operating devices, exceeds a specified value, and wherein the index is increased by a specific value in a loop evaluation of operating parameters of the motor vehicle if a maximum braking wish is above an upper threshold.

2. The method according to claim 1, wherein the operating devices include an accelerator pedal.

3. The method according to claim 2, wherein the prefilling is activated in the operating mode as soon as the accelerator pedal is de-actuated to decrease the torque request.

4. The method according to claim 1, wherein the operating mode is determined as a function of at least one of (a) dynamics and (b) limit values of a driver-side torque request.

5. The method according to claim 4, wherein the determination of the operating mode takes into consideration both a maximum value of the driver-side torque request and a gradient of a modification of the driver-side torque request.

6. The method according to claim 1, wherein the operating mode is determined as a function of at least one of (a) dynamics and (b) limit values of a deceleration request.

7. The method according to claim 6, wherein the deceleration request is made via actuation of a brake pedal, and the determination of the operating mode takes into consideration a gradient of the deceleration request and at least one of (a) a maximum actuation distance and (b) a maximum actuation force.

8. The method according to claim 1, wherein the index remains unchanged in a loop evaluation of the operating parameters of the motor vehicle if the maximum braking wish is below the upper threshold and above a lower threshold.

9. The method according to claim 8, wherein the index is decreased by a specific value in a loop evaluation of the operating parameters of the motor vehicle if the maximum braking wish is below the lower threshold.

10. The method according to claim 1, wherein the prefilling of the brake system is performed when the gradient of actuation of the operating device becomes zero.

11. A computer-readable storage medium having a computer program, which is executable on a computer, comprising:
    a program code arrangement having program code for operating a brake system of a motor vehicle, which has at least one operating mode, by performing the following:
    prefilling the brake system, to at least partially overcome a clearance of at least one wheel brake prior to an expected actuation of a brake pedal, an actuation of the brake pedal being expected at least one of (a) specific positions and (b) gradients of de-actuation of an accelerator pedal of the motor vehicle; and
    specifying, in an operating mode, a gradient of de-actuation of the accelerator pedal as a function of at least one of (a) dynamics and (b) limit values of the actuation of operating devices of the motor vehicle;
    wherein the index is increased by a specific value in a loop evaluation of operating parameters of the motor vehicle if a maximum braking wish is above an upper threshold, and wherein the index remains unchanged in a loop evaluation of the operating parameters of the motor vehicle if the maximum braking wish is below the upper threshold and above a lower threshold.

12. The method according to claim 11, wherein the index is decreased by a specific value in a loop evaluation of the operating parameters of the motor vehicle if the maximum braking wish is below the lower threshold.

13. A device, comprising:
    a control device for a brake system of a motor vehicle, including at least one operating mode, the control device being configured to prefill the brake system, so as to at least partially overcome a clearance of at least one wheel brake prior to an expected actuation of a brake pedal, an actuation of the brake pedal being expected at least one of (a) specific positions and (b) gradients of de-actuation of an accelerator pedal of the motor vehicle,
    wherein the control device includes an operating mode in which a gradient of de-actuation of the accelerator pedal is specified as a function of at least one of (a) dynamics and (b) limit values of actuation of operating devices of the motor vehicle;
    wherein the operating devices include an accelerator pedal, wherein the prefilling is activated in the operating mode as soon as the position of the accelerator pedal is modified to a lower torque request, and wherein the operating mode is activated when an index, which is formed from at least one of (a) the dynamics and (b) the limit values of the actuation of the operating devices, exceeds a specified value.

14. The device according to claim 13, wherein the index is increased by a specific value in a loop evaluation of operating parameters of the motor vehicle if a maximum braking wish is above an upper threshold, and wherein the index remains unchanged in a loop evaluation of the operating parameters of the motor vehicle if the maximum braking wish is below the upper threshold and above a lower threshold.

15. The device according to claim 14, wherein the index is decreased by a specific value in a loop evaluation of the operating parameters of the motor vehicle if the maximum braking wish is below the lower threshold.

16. The device according to claim 13, wherein the operating devices include an accelerator pedal.

* * * * *